UNITED STATES PATENT OFFICE.

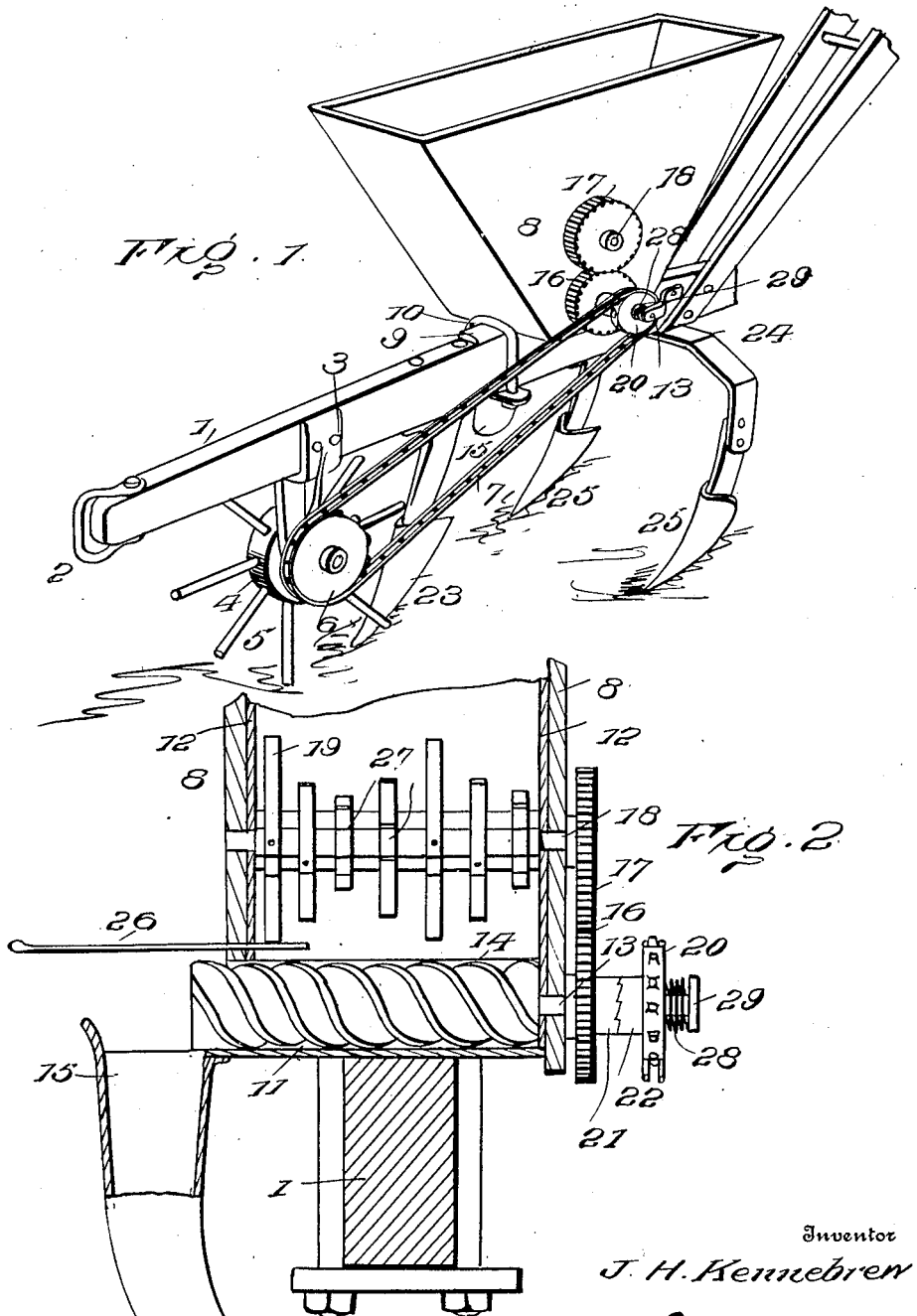

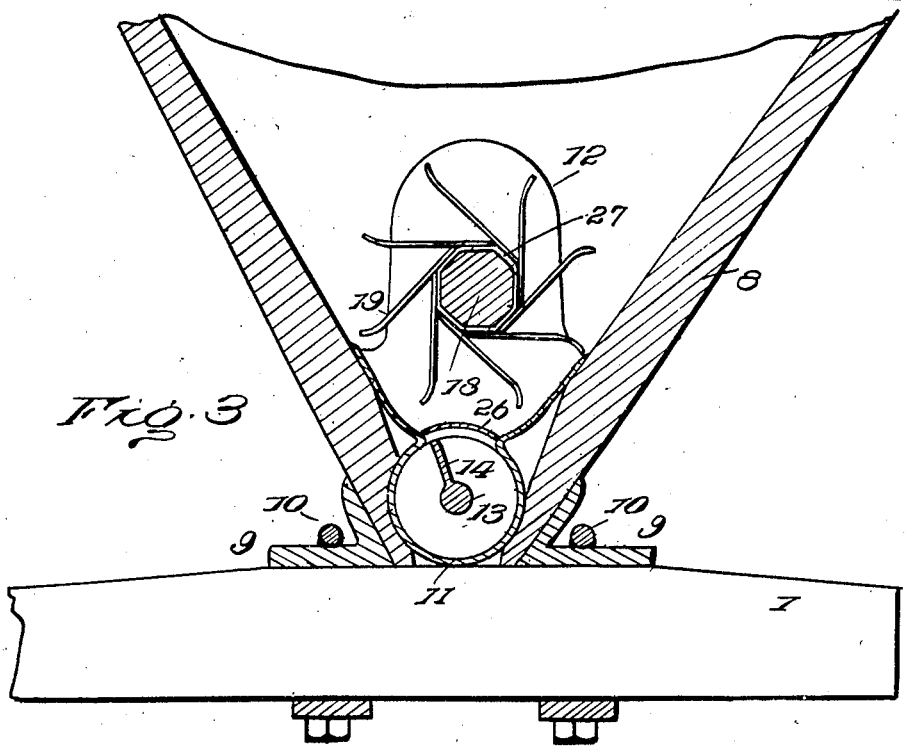
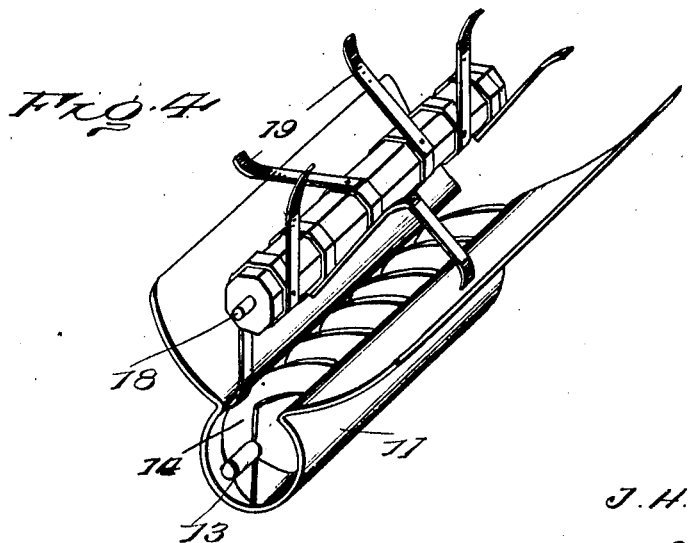

JOHN H. KENNEBREW, OF COLUMBUS, MISSISSIPPI.

PLANTER.

No. 878,536.

Specification of Letters Patent.

Patented Feb. 11, 1908.

Application filed April 17, 1907. Serial No. 368,680.

To all whom it may concern:

Be it known that I, JOHN H. KENNEBREW, citizen of the United States, residing at Columbus, in the county of Lowndes and State of Mississippi, have invented certain new and useful Improvements in Planters, of which the following is a specification.

The present invention relates in general to agricultural implements and more particularly to a novel form of planter which is peculiarly designed so as to operate in an efficient manner in connection with various types of seeds.

The object of the invention is to provide a simple and comparatively inexpensive planter which is durable in its construction and which is at all times under the complete control of the operator, means being provided whereby the feeding of the seeds into the discharge spout can be regulated at will.

For a full description of the invention and the merits thereof and also to acquire a knowledge of the details of construction and the means for effecting the result, reference is to be had to the following description and accompanying drawings, in which:

Figure 1 is a perspective view showing a planter constructed in accordance with the present invention. Fig. 2 is an enlarged sectional view through the lower portion of the hopper. Fig. 3 is a similar view taken at right angles to Fig. 2. Fig. 4 is a detail view of the feeding mechanism located within the hopper.

Corresponding and like parts are referred to in the following description and indicated in all the views of the drawings by the same reference characters.

Specifically describing the present embodiment of the invention the numeral 1 designates the stock of the planter which is in the nature of a longitudinal beam and is provided at its forward end with a clevis 2 of the conventional construction. Secured to the forward portion of the stock and projecting downwardly therefrom is a bracket 3 having the drive wheel 4 mounted thereon, the said drive wheel comprising a hub having a plurality of radial arms or spokes 5 projecting therefrom and designed to engage with the ground to cause the rotation of the wheel when the planter is moved either forwardly or rearwardly. Rigid with the drive wheel 4 and rotating therewith is a sprocket wheel 6 receiving a chain 7 by means of which power is transmitted to the feeding mechanism.

A hopper 8 of the usual contour is adjustably mounted upon the upper face of the stock 1 toward the rear end thereof and is provided with the brackets 9 projecting along the stock and clamped thereto by means of the U-bolts 10. It will thus be apparent that by loosening the said U-bolts the hopper can be moved longitudinally upon the beam and again clamped in the required position.

A transversely disposed trough 11 is located at the bottom of the hopper, and in the present instance this trough is formed by suitably bending a piece of sheet material, the opposite ends of the piece of sheet material extending along the front and rear sides of the hopper respectively and being secured thereto. Bearing plates 12 are secured to opposite sides of the hopper 8 and journaled between the lower portions of these bearing plates 12 is a shaft 13 carrying a spiral 14 which operates within the trough 11 and tends to discharge the seed delivered within the trough through one end thereof into the discharge spout 15 upon one side of the planter.

It will be observed that the upper end of the discharge spout 15 is open whereby the feeding of the seeds is always in plain view of the operator. One end of the shaft 13 projects laterally from the hopper and carries a gear wheel 16 meshing with a corresponding gear wheel 17 keyed upon a shaft 18 journaled between the upper portions of the bearing plates 12. This upper shaft 18 carries the agitator or stirring device which is essentially in the nature of a toothed drum. In the specific construction of the agitator it will be observed that the shaft 18 has an angular formation, being hexagonal in cross section in the present instance, and carries the tangential arms or teeth 19. In the form of invention shown in the drawings the teeth 19 are integral with collars 27 which are slipped over the angular portion of the shaft 15, each collar carrying two teeth and the said collars being so arranged that the teeth form two spiral rows which operate to agitate the seed within the hopper and to cause the same to feed evenly into the trough.

A sprocket wheel 20 is loosely mounted upon the projecting end of the shaft 13 and receives motion from the drive wheel 4 through the medium of the sprocket wheel 6 and chain 7. This sprocket wheel 20 has a clutch connection with the gear wheel 16 whereby motion is imparted to the latter when the planter is moved forwardly. In bringing about this clutch connection the gear wheel 16 is formed with an outwardly extending sleeve 21 and the sprocket wheel 20 with an inwardly extending sleeve 22, the said sleeves being formed with corresponding teeth having inclined sides and straight sides, the former slipping over each other when the planter is moved backwardly, while the latter engage with each other when the planter is moved forwardly and thereby cause the feed mechanism to be operated through the medium of the drive wheel. For the purpose of normally holding the teeth upon the sleeves 21 and 22 in engagement with each other the portion of the shaft projecting beyond the sprocket wheel 20 is surrounded by a coil spring 28 which is interposed between the strap 29 and the sprocket wheel 20 and tends to move the latter inwardly upon the shaft.

The plow standard and point or furrow opener 23 is secured to the stock 1 in front of the hopper and operates to open the furrow previous to the deposit of the seeds therein through the medium of the spout 15 and the above described feeding mechanism. A transverse bar 24 is secured to the rear end of the beam 1 and carries the spaced plows 25 which cover the furrow after the seeds have been deposited therein.

In order to regulate the feeding of the seeds from the hopper into the trough a slide 26 is employed which operates over the trough and regulates the effective size of the feed opening leading from the hopper into the said trough.

Having thus described the invention, what is claimed as new is:

1. In a planter, the combination of a stock, a hopper mounted upon the stock, a trough at the bottom of the hopper, a discharge spout at one end of the trough, a spiral feeder operating within the trough, an angular agitator shaft journaled between the sides of the hopper, removable collars fitted upon the said angular shaft, tangential arms carried by the collars, and means for operating the feeder and agitator.

2. In a planter, the combination of a stock, a hopper mounted upon the stock, a trough at the bottom of the hopper formed by bending a piece of sheet material, bearing plates applied to opposite sides of the hopper, a spiral feeding mechanism operating within the trough, and journaled between the lower portions of the plates, an agitator journaled between the upper portions of the plates, and means for operating the feeder and agitator.

In testimony whereof I affix my signature in presence of two witnesses.

JOHN H. KENNEBREW. [L. S.]

Witnesses:
B. D. EWEN,
Z. P. GOOLSBY.